(12) United States Patent
Payne et al.

(10) Patent No.: US 6,250,007 B1
(45) Date of Patent: Jun. 26, 2001

(54) CATTLE STUNNING GUN IMPROVEMENT

(75) Inventors: Billy C. Payne, Garden City; John Steinhauser, Blue Springs, both of MO (US)

(73) Assignee: Koch Supplies Holdings LLC, St. Louis, MO (US)

( * ) Notice: Subject to any disclaimer, the term of this patent is extended or adjusted under 35 U.S.C. 154(b) by 0 days.

(21) Appl. No.: 09/321,071

(22) Filed: May 27, 1999

(51) Int. Cl.$^7$ .................................................. F41C 3/00
(52) U.S. Cl. ...................................... 42/1.12; 42/77
(58) Field of Search .............................. 42/1.12, 1.08, 42/90, 106

(56) References Cited

U.S. PATENT DOCUMENTS

| | | | |
|---|---|---|---|
| 801,839 | * 10/1905 | Behr | 42/1.12 |
| 1,435,573 | * 11/1922 | Accles | 42/1.12 |
| 2,736,118 | * 2/1956 | Clarkson et al. | 42/76.02 |
| 2,736,119 | * 2/1956 | Clarkson et al. | 42/76.02 |
| 2,850,828 | * 9/1958 | Sullivan | 42/76.02 |
| 2,922,185 | * 1/1960 | Aitken et al. | 42/1.12 |
| 3,067,454 | * 12/1962 | Catlin et al. | 42/1.12 |
| 3,895,454 | * 7/1975 | Hancox | 42/1.12 |
| 4,086,682 | * 5/1978 | Hancox | 42/1.12 |
| 4,625,442 | 12/1986 | Hill et al. | 42/1.12 |

FOREIGN PATENT DOCUMENTS

| | | | |
|---|---|---|---|
| 0027923 | * 4/1903 | (CH) | 42/1.12 |
| 0233207 | * 10/1944 | (CH) | 42/76.02 |

OTHER PUBLICATIONS

Koch Magnum .25™ Stunner Operating Instructions.

* cited by examiner

*Primary Examiner*—Michael J. Carone
*Assistant Examiner*—Denise J Buckley
(74) *Attorney, Agent, or Firm*—Thompson Coburn LLP; Robert C. Haldiman; Grant D. Kang

(57) ABSTRACT

A method of providing a new cartridge chamber for the breech of a cattle stunning gun for the purpose of improving the ability of the chamber surface to resist corrosive deformation resulting from firing cartridges in the gun. The method includes machining the breech to remove the original surface and providing an insert sleeve which replaces the machined material with a harder and more resistant material. The disclosure includes the configuration of the insert and its relationship to the machined breech.

4 Claims, 1 Drawing Sheet

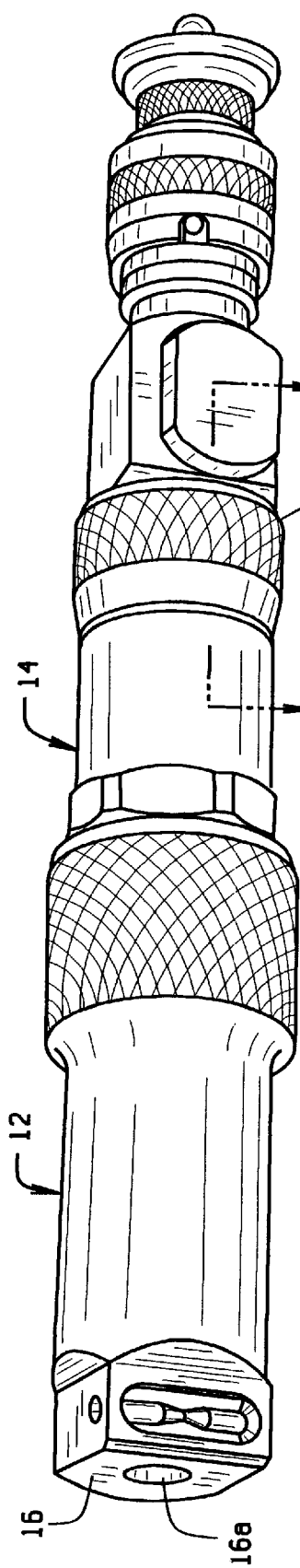
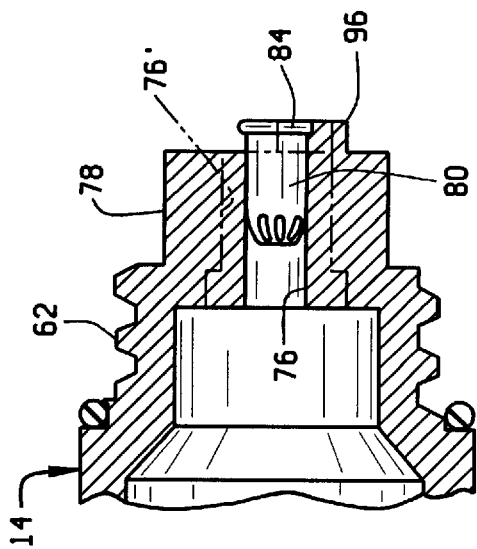
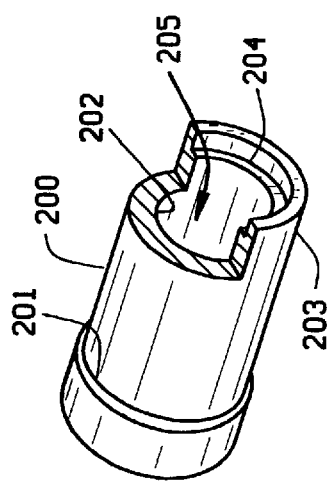
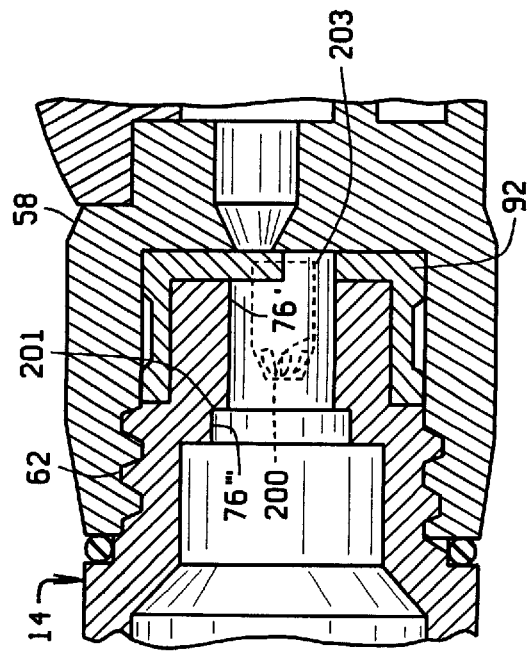
FIG. 1 PRIOR ART
FIG. 2
FIG. 3
FIG. 4

CATTLE STUNNING GUN IMPROVEMENT

This invention is directed to improvements in construction and operation of stunning guns used in the processing of livestock, principally cattle.

BACKGROUND OF THE INVENTION

In stunning guns of which we are aware, the guns utilize a moveable bolt which is placed at the temple of the animal and propelled into stunning contact by the firing of a blank (no projectile) cartridge. The cartridge is loaded into a breech mechanism which is positioned to direct the explosive force of the fired cartridge against one end of the bolt. The spent cartridge case can be extracted from the breech for reloading. A typical heretofore successful gun design is that described in U.S. Pat. No. 4,625,442 issued Dec. 2, 1986 ("the '442 patent"), the disclosure of which is incorporated herein by reference, and marketed as the Koch Magnum .25 Stunner by Koch Suppliers, Inc. of Kansas City, Mo.

In recent years, there has been an effort to get away from the use of cartridges which have lead or barium containing propellants, which present adverse air pollution and other problems. Cartridges utilizing a plastic explosive rather than the conventional powders have been developed. One characteristic of the plastic is, however, that its firing results in a myriad of fine glass-like particles being discharged from the open end of the cartridge case.

It has been discovered that the newer plastic loads have consequences for the stunning gun that shorten the effective life of the breech mechanism, in particular. Apparently the presence of the glass-like particles emanating from the open end of the cartridge creates erosion of the breech surface adjacent to the open end and creates as a result of repeated firings an annular depression adjacent the open end. As the depression increases in width and depth it provides a space into which the casing portion adjacent to the open end (or least some part of it) can expand outwardly and into the eroded area. This expansion and deformation of the casing into the irregularity creates a locking effect which interferes with extraction of the spent casing from the breech to the extent that the guns affected become effectively inoperable.

SUMMARY OF THE INVENTION

A primary object of our invention is to provide a method and structure for modifying present guns to eliminate the aforesaid deleterious effects of the plastic propellants. In our invention we modify the cartridge receiving section of the breech in a way that increases greatly the resistance of the breech to the deformation effects of the plastic explosive. The modification is achieved without requiring complete replacement of the breech.

The modification is effected by machining the original breech to accommodate a specially designed and constructed sleeve insert which preserves the mechanical advantages of the original breech mechanism as to loading fresh cartridges and extracting spent casings and which increases materially the ability of the breech to resist the abrading and eroding effect of the plastic propellants heretofore described. We have determined that an unmodified gun having generally the design of the '442 patent deteriorates rather rapidly because of the abrading effect of the propellant. A typical unmodified gun operates for a life of approximately 5,000 rounds. With the employment of our invention, the life of the gun can be increased to approximately 50,000 to 60,000 rounds which is a significant factor in reducing costs of gun replacement.

Other and further objects and advantages will appear in the course of the following description.

DETAILED DESCRIPTION

In the accompanying drawing, which forms a part of the specification and is to be read in conjunction therewith;

FIG. 1 is a side perspective view of a stunning gun substantially as shown and described in the '422 patent;

FIG. 2 is a partial enlarged longitudinal section of the cartridge receiving portion of the breech mechanism and includes broken lines indicating the areas of material removal removed as a part of the modification process;

FIG. 3 is a side perspective view of the insert sleeve which is fitted into the breech after removal of the material; and FIG. 4 is a partially sectional view of the breech section of the modified gun showing the insert sleeve in its installed and operative position in the breech.

Referring initially to FIG. 1, a stunning gun according generally to the '422 patent is illustrated. For ease of understanding, the parts are identified herein by the same reference numerals as used in the patent.

The stunning gun has a body formed by a barrel 12 and a breech 14 which are axially aligned and threaded together. The barrel has a muzzle end 16 provided with an axial opening 16a through which the active end of the bolt is fired during operation. The breech and barrel cooperate to provide a continuous axial bore within the body of the gun. This bore receives and provides for firing and retraction of the bolt, but a description of further details of this construction and operation are not necessary to an understanding of the present invention.

The breech 14 is capped at the end opposite from the bolt by a breech cap 58. The breech cap includes the firing pin, trigger and safety mechanism. As can be seen from the '422 patent, the breech cap and its associated parts are mounted to the breech by a quick acting threaded coupling 62 which permits ready assembly and disassembly of the breech cap from the breech for access to the cartridge chamber in the breech.

Referring now additionally to FIG. 2, that portion of the breech which receives a cartridge and supports it in a firing chamber is shown. The breech cap has been removed (not shown in this FIG.). The extractor ring (also not shown) but clearly illustrated in FIGS. 8 and 9 of the '422 patent has also been removed for purposes of illustration.

The breech 14 includes the fast connect threads forming part of the threaded coupling 62 which cooperate with internal threads in the breech cap. Positioned centrally of the breech is the neck portion 78 which comprises a cylindrical section having the axial cartridge chamber 76 in the form of a cylindrical bore having a diameter dimension to closely receive the body of a cartridge 80. The cartridge is a blank, in the sense of having no projectile. The discharge end is crimped generally as illustrated and the opposite end is provided with an annular rim 84 containing the primer. The rim sits on a cooperating grooved arcuate seat portion formed in a boss 96 formed on the end of neck 78 (the boss 96 supports approximately one-half the rim of the rim; the other half is supported on a similar arcuate surface formed in the extractor ring). FIG. 2 illustrates the cartridge in position for firing in a gun configured as originally described in the '422 patent.

The modification of the gun in accordance with the present invention involves the machining out of the cartridge chamber 76 to increase its diameter. The machining is the forming of a new bore which is shown by the broken lines 76' in FIG. 2 and at 76" in FIG. 4. The purpose of the reboring is to accommodate an insert sleeve 200 which is shown in FIG. 3 as well as FIG. 4.

The new bore formed in the breech neck is a cylindrical bore of substantially uniform radius along the same axis as the original cartridge chamber 76 and extends on through a portion of the boss 96. At the discharge end of the cartridge chamber, a slightly larger counter-bore 76''' is formed in order to provide a stepped annular lip which engages a circumferential lip 201 on the insert when the latter is assembled into the remachined breech.

In the preferred embodiment, the insert 200 is formed from SAE 01 tool steel. It includes the central tubular cartridge chamber 202 the extension portion 203 in which is formed a semicircular cartridge rim seat 204. The extension portion 203 defines an open top portion 205 of said insert 200. The inside diameter of the cartridge chamber 202 is tapered slightly inwardly in the direction of the cartridge firing (right to left as viewed in FIG. 4) in order to provide assistance in extraction of spent cartridges or unfired cartridges when necessary. In the preferred embodiment we have employed a No. 4 taper pin reamer.

The outside diameter of the insert sleeve is slightly greater than the inside diameter is of the rebored surface 76' of the breach so as to provide an interference fit between the sleeve and the re-machined breech. In our preferred embodiment, we employ a 0.001 interference fit.

The insert sleeve is treated in a fashion to provide increased hardness and resistance to erosion by the propellant. In our preferred embodiment, we employ a procedure in which the insert after its forming is heated to approximately 1475° F. and held at that temperature for 15 minutes. It is then quenched in a room temperature oil bath until cooled to the bath temperature. The sleeve is then removed from the bath and reheated to 2350° F. and held at that temperature for one hour. This produces a hardness of approximately RC 60–62.

The insert sleeve is assembled into the rebored breech by introducing it from the muzzle end, inserting it axially in the rebored passage and press fitting it axially inwardly until the enlarged annular portion forming lip 201 is seated in the counter-bore.

The extractor ring 92 is reinstalled as shown in FIG. 4 and in the '422 patent and the gun is now ready for operation according to the '422 patent.

From the foregoing, it will be seen that this invention is one that is adapted to obtain all the ends and objectives hereinabove set forth together with other advantages which are obvious and which are inherent to the method and structure.

It will be understood that certain features and subcombinations are of the utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, we claim:

1. A method of enhancing the extractability of spent cartridge casings from a livestock stunning gun having a cartridge chamber in which cartridges are fired, said cartridge chamber having surfaces adjacent the discharge end of the cartridge exposed to erosive contact of the discharge from the fired cartridge, said method including;

removing material in said chamber to remove said surfaces, forming an insert member having a shape to fit within said gun and provide replacement surfaces comporting to said removed surfaces and of greater hardness than the hardness of the removed surfaces, said insert member including an extension portion forming a seat and defining an open top portion of said insert, and assembling said insert member with said gun to provide a new firing chamber.

2. A livestock stunning gun having a breech including a firing chamber for receiving and holding cartridges during firing of the cartridges, said firing chamber having surfaces exposed to erosive contact by the discharge from a fired cartridge, said surfaces being provided by an insert in the breech, said insert including an extension portion forming a seat and defining an open top portion of said insert, said insert providing said firing chamber with increased hardness and resistance to erosion of said chamber caused by firing of said cartridge.

3. A livestock stunning gun as in claim 2, in which the interior of said sleeve is slightly tapered inwardly in the axial direction of cartridge discharge.

4. A livestock stunning gun of the type wherein a movable bolt is slidably mounted within a cartridge chamber and said bolt is propelled within said chamber by a non-projectile cartridge from a retraced position into a stunning position, further including the improvement comprising:

an insert mounted within said chamber for increasing the hardness and of said firing chamber and increasing the resistance of said chamber to erosion caused by the firing of said cartridge.

\* \* \* \* \*